(12) United States Patent
Yoshioka et al.

(10) Patent No.: US 12,058,082 B2
(45) Date of Patent: Aug. 6, 2024

(54) COMMUNICATION DEVICE AND COMMUNICATION METHOD

(71) Applicant: NTT DOCOMO, INC., Tokyo (JP)

(72) Inventors: Shohei Yoshioka, Tokyo (JP); Tomoya Ohara, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 402 days.

(21) Appl. No.: 17/429,441

(22) PCT Filed: Feb. 15, 2019

(86) PCT No.: PCT/JP2019/005718
§ 371 (c)(1),
(2) Date: Aug. 9, 2021

(87) PCT Pub. No.: WO2020/166090
PCT Pub. Date: Aug. 20, 2020

(65) Prior Publication Data
US 2022/0123915 A1    Apr. 21, 2022

(51) Int. Cl.
*H04L 5/14* (2006.01)
*H04W 72/20* (2023.01)

(52) U.S. Cl.
CPC .............. *H04L 5/14* (2013.01); *H04W 72/20* (2023.01)

(58) Field of Classification Search
CPC ....... H04L 5/14; H04L 5/0048; H04L 5/0073; H04L 5/0094; H04L 5/0092; H04L 5/0082; H04L 5/0053; H04L 5/0051; H04L 5/10; H04W 72/20; H04W 4/40; H04W 92/18; H04W 72/56; H04W 24/10; H04W 74/08; H04W 88/04; H04W 72/0446; H04W 72/23; H04W 88/10; H04W 72/04; H04B 17/30

See application file for complete search history.

(56) References Cited

U.S. PATENT DOCUMENTS

| | | | | |
|---|---|---|---|---|
| 11,595,858 B2* | 2/2023 | Lee | ......................... | H04W 76/14 |
| 11,601,936 B2* | 3/2023 | Yang | ..................... | H04L 5/0044 |
| 11,671,941 B2* | 6/2023 | Lee | ......................... | H04W 72/56 |
| | | | | 370/329 |
| 11,778,631 B2* | 10/2023 | Kwak | .................... | H04L 5/0048 |
| | | | | 370/329 |
| 2023/0254823 A1* | 8/2023 | Wang | ................ | H04W 72/0453 |
| | | | | 370/329 |

OTHER PUBLICATIONS

Office Action issued in the counterpart Chinese Patent Application No. 201980091677.1, mailed on Jun. 2, 2023 (15 pages).
(Continued)

*Primary Examiner* — Brian T O Connor
(74) *Attorney, Agent, or Firm* — Osha Bergman Watanabe & Burton LLP

(57) ABSTRACT

A communication device includes a receiving unit that receives information indicating a time division duplex (TDD) configuration; a control unit that obtains information related to an uplink, in the received information indicating the TDD configuration; and a transmitting unit that transmits the information related to the uplink on a sidelink.

4 Claims, 17 Drawing Sheets

(56) References Cited

OTHER PUBLICATIONS

Extended European Search Report in counterpart European Application No. 19 91 5135.8 issued Jul. 26, 2022 (8 pages).
Huawei et al.; "Frame and slot structure for sidelink"; 3GPP TSG RAN WG1 Ad-Hoc Meeting #1901, R1-1900856; Taipei; Jan. 21-25, 2019 (5 pages).
International Search Report issued in PCT/JP2019/005718 on May 7, 2019 (5 pages).
Written Opinion of the International Searching Authority issued in PCT/JP2019/005718 on May 7, 2019 (4 pages).
3GPP TS 38.213 V15.4.0; "3rd Generation Partnership Project; Technical Specification Group Radio Access Network; NR; Physical layer procedures for control (Release 15)"; Dec. 2018 (104 pages).
3GPP TS 38.211 V15.4.0; "3rd Generation Partnership Project; Technical Specification Group Radio Access Network; NR; Physical channels and modulation (Release 15)"; Dec. 2018 (96 pages).
3GPP TS 38.331 V15.4.0; "3rd Generation Partnership Project; Technical Specification Group Radio Access Network; NR; Radio Resource Control (RRC) protocol specification (Release 15)"; Dec. 2018 (474 pages).
Sharp; "Considerations on synchronization design for NR V2X"; 3GPP TSG RAN WG1 Ad-Hoc Meeting 1901, R1-1900832; Taipei, Taiwan; Jan. 21-25, 2019 (4 pages).

* cited by examiner

FIG.12

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on *TDD-UL-DL-ConfigurationCommon*, or *TDD-UL-DL-ConfigDedicated* and, if any, on detected DCI formats | | | | | | | | | | | | | |

FIG.13

```
SlotFormatCombinationsPerCell ::=    SEQUENCE {
    servingCellId                    ServCellIndex,
    subcarrierSpacing                SubcarrierSpacing,
    subcarrierSpacing2               SubcarrierSpacing,
    slotFormatCombinations           SEQUENCE (SIZE (1..maxNrofSlotFormatCombinationsPerSet)) OF SlotFormatCombination OPTIONAL,   -- Need R
    positionInDCI                    INTEGER(0..maxSFI-DCI-PayloadSize-1)                                                OPTIONAL,   -- Need M
    ...                                                                                                                            OPTIONAL,   -- Need M
}

SlotFormatCombination ::=    SEQUENCE {
    slotFormatCombinationId          SlotFormatCombinationId,
    slotFormats                      SEQUENCE (SIZE (1..maxNrofSlotFormatsPerCombination)) OF INTEGER (0..255)
}

SlotFormatCombinationId ::=    INTEGER (0..maxNrofSlotFormatCombinationsPerSet-1)

SlotFormatIndicator ::=    SEQUENCE {
    sfi-RNTI                         RNTI-Value,
    dci-PayloadSize                  INTEGER (1..maxSFI-DCI-PayloadSize),
    slotFormatCombToAddModList       SEQUENCE (SIZE(1..maxNrofAggregatedCellsPerCellGroup)) OF SlotFormatCombinationsPerCell OPTIONAL,   -- Need N
    slotFormatCombToReleaseList      SEQUENCE (SIZE(1..maxNrofAggregatedCellsPerCellGroup)) OF ServCellIndex                 OPTIONAL,   -- Need N
    ...
}
```

FIG.14

```
TDD-UL-DL-ConfigCommon ::=         SEQUENCE {
    referenceSubcarrierSpacing         SubcarrierSpacing,
    pattern1                           TDD-UL-DL-Pattern,
    pattern2                           TDD-UL-DL-Pattern          OPTIONAL, -- Need R
    ...
}

TDD-UL-DL-Pattern ::=              SEQUENCE {
    dl-UL-TransmissionPeriodicity      ENUMERATED {ms0p5, ms0p625, ms1, ms1p25, ms2, ms2p5, ms5, ms10},
    nrofDownlinkSlots                  INTEGER (0..maxNrofSlots),
    nrofDownlinkSymbols                INTEGER (0..maxNrofSymbols-1),
    nrofUplinkSlots                    INTEGER (0..maxNrofSlots),
    nrofUplinkSymbols                  INTEGER (0..maxNrofSymbols-1),
    ...,
    [[
    dl-UL-TransmissionPeriodicity-v1530    ENUMERATED {ms3, ms4}      OPTIONAL -- Need R
    ]]
}

TDD-UL-DL-ConfigDedicated ::=      SEQUENCE {
    slotSpecificConfigurationsToAddModList     SEQUENCE (SIZE (1..maxNrofSlots)) OF TDD-UL-DL-slotConfig    OPTIONAL, -- Need N
    slotSpecificConfigurationsToreleaseList    SEQUENCE (SIZE (1..maxNrofSlots)) OF TDD-UL-DL-SlotIndex     OPTIONAL, -- Need N
    ...
}

TDD-UL-DL-SlotConfig ::=           SEQUENCE {
    slotIndex                          TDD-UL-DL-SlotIndex,
    symbols                            CHOICE {
        allDownlink                        NULL,
        allUplink                          NULL,
        explicit                           SEQUENCE {
            nrofDownlinkSymbols                INTEGER (1..maxNrofSymbols-1)       OPTIONAL -- Need S
            nrofUplinkSymbols                  INTEGER (1..maxNrofSymbols-1)       OPTIONAL -- Need S
        }
    }
}
```

FIG.15

| Format for SL | Format | Symbol number in a slot | | | | | | | | | | | | | |
|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 |
| 0 → | 0 | D | D | D | D | D | D | D | D | D | D | D | D | D | D |
| 1 → | 1 | U | U | U | U | U | U | U | U | U | U | U | U | U | U |
| | 2 | F | F | F | F | F | F | F | F | F | F | F | F | F | F |
| | 3 | D | D | D | D | D | D | D | D | D | D | D | D | D | F |
| | 4 | D | D | D | D | D | D | D | D | D | D | D | D | F | F |
| | 5 | D | D | D | D | D | D | D | D | D | D | D | F | F | F |
| | 6 | D | D | D | D | D | D | D | D | D | D | F | F | F | F |
| | 7 | D | D | D | D | D | D | D | D | D | F | F | F | F | F |
| 2 → | 8 | F | F | F | F | F | F | F | F | F | F | F | F | F | U |
| ⋮ | 9 | F | F | F | F | F | F | F | F | F | F | F | F | U | U |
| | 10 | F | U | U | U | U | U | U | U | U | U | U | U | U | U |
| | 11 | F | F | U | U | U | U | U | U | U | U | U | U | U | U |
| | 12 | F | F | F | U | U | U | U | U | U | U | U | U | U | U |
| | 13 | F | F | F | F | U | U | U | U | U | U | U | U | U | U |
| | 14 | F | F | F | F | F | U | U | U | U | U | U | U | U | U |
| | 15 | F | F | F | F | F | F | U | U | U | U | U | U | U | U |
| | 16 | D | F | F | F | F | F | F | F | F | F | F | F | F | F |
| | 17 | D | D | F | F | F | F | F | F | F | F | F | F | F | F |
| | 18 | D | D | D | F | F | F | F | F | F | F | F | F | F | F |
| | 19 | D | F | F | F | F | F | F | F | F | F | F | F | F | U |
| | 20 | D | D | F | F | F | F | F | F | F | F | F | F | F | U |
| | 21 | D | D | D | F | F | F | F | F | F | F | F | F | F | U |
| | 22 | D | F | F | F | F | F | F | F | F | F | F | F | U | U |
| | 23 | D | D | F | F | F | F | F | F | F | F | F | F | U | U |
| | 24 | D | D | D | F | F | F | F | F | F | F | F | F | U | U |
| | 25 | D | F | F | F | F | F | F | F | F | F | F | U | U | U |
| | 26 | D | D | F | F | F | F | F | F | F | F | F | U | U | U |
| | 27 | D | D | D | F | F | F | F | F | F | F | F | U | U | U |
| | 28 | D | D | D | D | D | D | D | D | D | D | D | D | F | U |
| | 29 | D | D | D | D | D | D | D | D | D | D | D | F | F | U |
| | 30 | D | D | D | D | D | D | D | D | D | D | F | F | F | U |
| | 31 | D | D | D | D | D | D | D | D | D | D | D | F | U | U |
| | 32 | D | D | D | D | D | D | D | D | D | D | F | F | U | U |
| | 33 | D | D | D | D | D | D | D | D | D | F | F | F | U | U |
| | 34 | D | F | U | U | U | U | U | U | U | U | U | U | U | U |
| | 35 | D | D | F | U | U | U | U | U | U | U | U | U | U | U |
| | 36 | D | D | D | F | U | U | U | U | U | U | U | U | U | U |
| | 37 | D | F | F | U | U | U | U | U | U | U | U | U | U | U |
| | 38 | D | D | F | F | U | U | U | U | U | U | U | U | U | U |
| | 39 | D | D | D | F | F | U | U | U | U | U | U | U | U | U |
| | 40 | D | F | F | F | U | U | U | U | U | U | U | U | U | U |
| | 41 | D | D | F | F | F | U | U | U | U | U | U | U | U | U |
| | 42 | D | D | D | F | F | F | U | U | U | U | U | U | U | U |
| | 43 | D | D | D | D | D | D | D | D | D | F | F | F | F | U |
| | 44 | D | D | D | D | D | D | F | F | F | F | F | F | U | U |
| | 45 | D | D | D | D | D | D | F | F | U | U | U | U | U | U |
| | 46 | D | D | D | D | D | F | U | D | D | D | D | D | F | U |
| | 47 | D | D | F | U | U | U | U | D | D | F | U | U | U | U |
| | 48 | D | F | U | U | U | U | U | D | F | U | U | U | U | U |
| | 49 | D | D | D | D | F | F | U | D | D | D | D | F | F | U |
| | 50 | D | D | F | F | U | U | U | D | D | F | F | U | U | U |
| | 51 | D | F | F | U | U | U | U | D | F | F | U | U | U | U |
| | 52 | D | F | F | F | F | F | U | D | F | F | F | F | F | U |
| | 53 | D | D | F | F | F | F | U | D | D | F | F | F | F | U |
| | 54 | F | F | F | F | F | F | F | D | D | D | D | D | D | D |
| | 55 | D | D | F | F | F | U | U | U | D | D | D | D | D | D |
| | 56-254 | Reserved | | | | | | | | | | | | | |
| | 255 | UE determines the slot format for the slot based on *TDD-UL-DL-ConfigurationCommon*, or *TDD-UL-DL-ConfigDedicated* and, if any, on detected DCI formats | | | | | | | | | | | | | |

COMMUNICATION DEVICE AND COMMUNICATION METHOD

TECHNICAL FIELD

The present invention relates to a communication device and a communication method in a radio communication system.

BACKGROUND ART

In Long Term Evolution (LTE), successor systems of LTE (for example, LTE Advanced (LTE-A), and New Radio (NR) (also called 5G)), technology of sidelink (device to device (D2D)) has been studied in which communication devices, such as a user equipment (UE), perform communication directly with each other without going through a base station (for example, Non-Patent Document 1).

Furthermore, implementation of vehicle to everything (V2X) has been studied, and a specification has been developed. Here, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to nomadic device (V2N) meaning a communication mode performed between a vehicle and a mobile terminal of a driver, and vehicle to pedestrian (V2P) meaning a communication mode performed between a vehicle and a mobile terminal of a pedestrian as illustrated in FIG. 1.

RELATED ART DOCUMENT

Non-Patent Document

Non-Patent Document 1: 3GPP TS 38.213 V15.4.0 (2018-12)
Non-Patent Document 2: 3GPP TS 38.211 V15.4.0 (2018-12)
Non-Patent Document 3: 3GPP TS 38.331 V15.4.0 (2018-12)

SUMMARY OF THE INVENTION

Problem to be Solved by the Invention

For sidelink communication of the LTE, a notification of a TDD UL-DL configuration on a sidelink is transmitted through a physical sidelink broadcast channel (PSBCH). Accordingly, in NR, it is assumed that a notification of a TDD UL-DL configuration on a sidelink is transmitted through the PSBCH.

In NR, a degree of freedom of configuring an uplink symbol, a flexible symbol, and a downlink symbol in one slot is large. In this case, an information amount of a slot format to be provided by notification through the sidelink may increase. There is a need for a technology with which an information amount for providing notification of a TDD configuration or a slot format through a sidelink can be reduced.

Means for Solving the Problem

According to an aspect of the present invention, there is provided a communication device including a receiving unit that receives information indicating a time division duplex (TDD) configuration; a control unit that obtains information related to an uplink, in the received information indicating the TDD configuration; and a transmitting unit that transmits the information related to the uplink on a sidelink.

Advantage of the Invention

According to an embodiment, a technology is provided with which an information amount for notifying a TDD configuration or a slot format through a sidelink can be reduced.

BRIEF DESCRIPTION OF DRAWINGS

FIG. 8B is a diagram illustrating an outline of SL transmission mode 2a;
FIG. 12 is a diagram illustrating an example of a slot format used in the method of configuring a dynamic TDD configuration;
FIG. 13 is a diagram illustrating an example of a parameter for notifying a slot format in the method of configuring a dynamic TDD configuration;
FIG. 14 is a diagram illustrating an example of a parameter for notifying a TDD configuration in the method of configuring a dynamic TDD configuration;
FIG. 15 is a diagram illustrating an example of grouping of slot formats.

EMBODIMENTS OF THE INVENTION

Hereinafter, embodiments of the present invention are described with reference to the appended drawings. The embodiments described below are an example, and embodiments to which the present invention is applied are not limited to the following embodiments.

In the embodiments, it is assumed that a direct communication scheme between communication devices is sidelink (SL) of LTE or NR, but the direct communication scheme is not limited to this scheme. Furthermore, the name "sidelink" is an example, and uplink (UL) may include a function of SL without using the name "sidelink." The SL may be distinguished from downlink (DL) or UL by a difference in a frequency or time resource or may be another name.

Furthermore, UL and SL may be distinguished by a difference of one or more combinations of a time resource, a frequency resource, a time/frequency resource, a reference signal to be referred to so as to determine a path loss in transmission power control, and a reference signals (PSS/SSS/PSSS/SSSS) used for synchronization.

For example, in UL, a reference signal of an antenna port X is used as the reference signal to be referred to so as to determine the path loss in the transmission power control, and in SL (including UL used as SL), a reference signal of an antenna port Y is used as the reference signal to be referred to so as to determine the path loss in the transmission power control.

Furthermore, in the embodiments, a configuration in which a communication device is installed in a vehicle is mainly assumed, but an embodiment of the present invention is not limited to this configuration. For example, a communication device may be a terminal carried by a person, a communication device may be a drone or a device installed in an aircraft, and a communication device may be a base station, an RSU, a relay station (relay node), a user equipment provided with scheduling capability, or the like.

Overview of Sidelink

In the embodiment, since sidelink is a basic technique used here, first, an overview of sidelink is described as a basic example. An example of a technique described here is a technique specified in Rel. 14 of 3GPP or the like. This technique may be used in NR, or a technique different from this technique may be used in NR. A sidelink communication may be defined to be a direct communication performed among two or more neighboring units of user equipment by using E-UTRA technology, without going through a network node. A sidelink may be defined to be an interface between units of user equipment in a sidelink communication.

Figure 1:
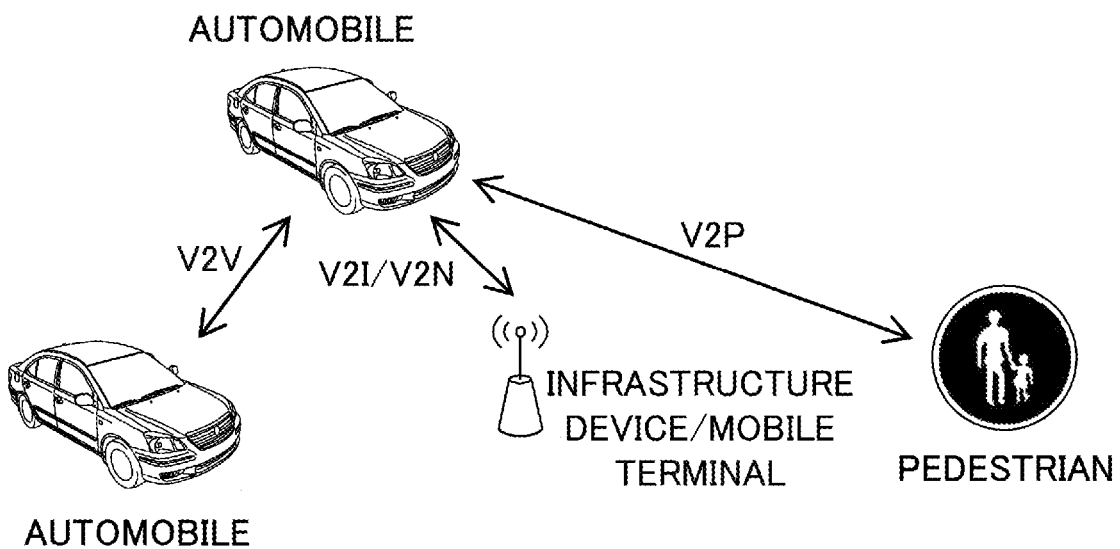
FIG. 1 is a diagram for illustrating V2X.
Figure 2A:
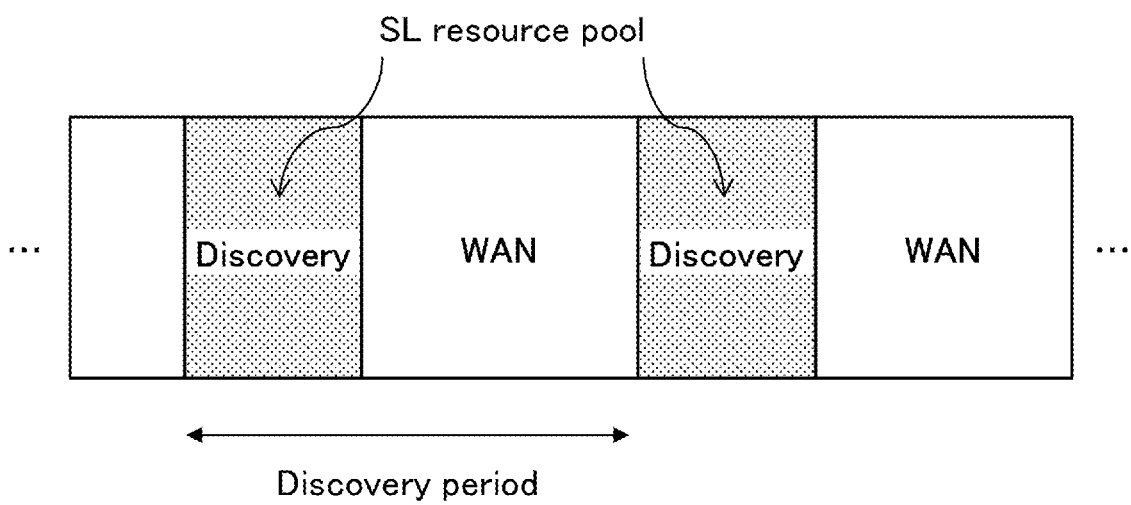
FIG. 2A is a diagram for illustrating sidelink.

Sidelink is roughly divided into "discovery" and "communication." For "discovery," as illustrated in FIG. 2A, a discovery message resource pool is configured for each discovery period, and a communication device (referred to as a UE) transmits a discovery message (discovery signal) within the resource pool. More specifically, there are Type 1 and Type 2b. In Type 1, a communication device autonomously selects a transmission resource from the resource pool. In Type 2b, a quasi-static resource is allocated by higher layer signaling (for example, an RRC signal).

Figure 2B:
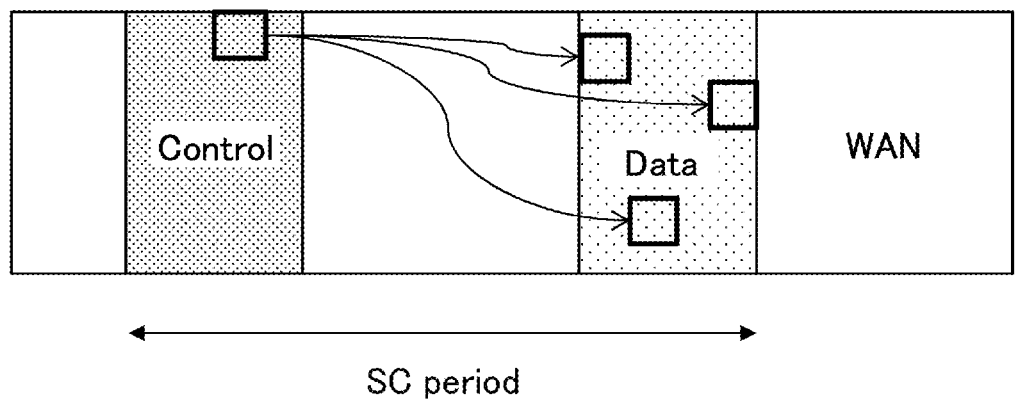
FIG. 2B is a diagram for illustrating sidelink.

For "communication," as illustrated in FIG. 2B, a sidelink control information (SCI)/data transmission resource pool is periodically configured. A communication device on a transmission side notifies a reception side of a data transmission resource (PSSCH resource pool) or the like through the SCI with the resource selected from the control resource pool (PSCCH resource pool), and transmits data with the data transmission resource. For "communication," in further detail, there are a mode 1 and a mode 2. In the mode 1, resources are dynamically allocated by an (enhanced) physical downlink control channel ((E) PDCCH) transmitted from a base station to a communication device. In the mode 2, a communication device autonomously selects a transmission resource from the resource pool. For example, the resource pool is provided by notification through SIB, for example, and is predefined.

In Rel-14, in addition to the mode 1 and the mode 2, there are a mode 3 and a mode 4. In Rel-14, SCI and data can be transmitted simultaneously (in one sub frame) with resource blocks that are adjacent in a frequency direction. The SCI is also referred to as scheduling assignment (SA).

A channel used for "discovery" is referred to as a physical sidelink discovery channel (PSDCH), a channel for transmitting control information such as the SCI in "communication" is referred to as a physical sidelink control channel (PSCCH), and a channel for transmitting data is referred to as a physical sidelink shared channel (PSSCH). The PSCCH and the PSSCH have a PUSCH-based structure and have a structure in which a demodulation reference signal (DMRS) is inserted.

Figure 3:
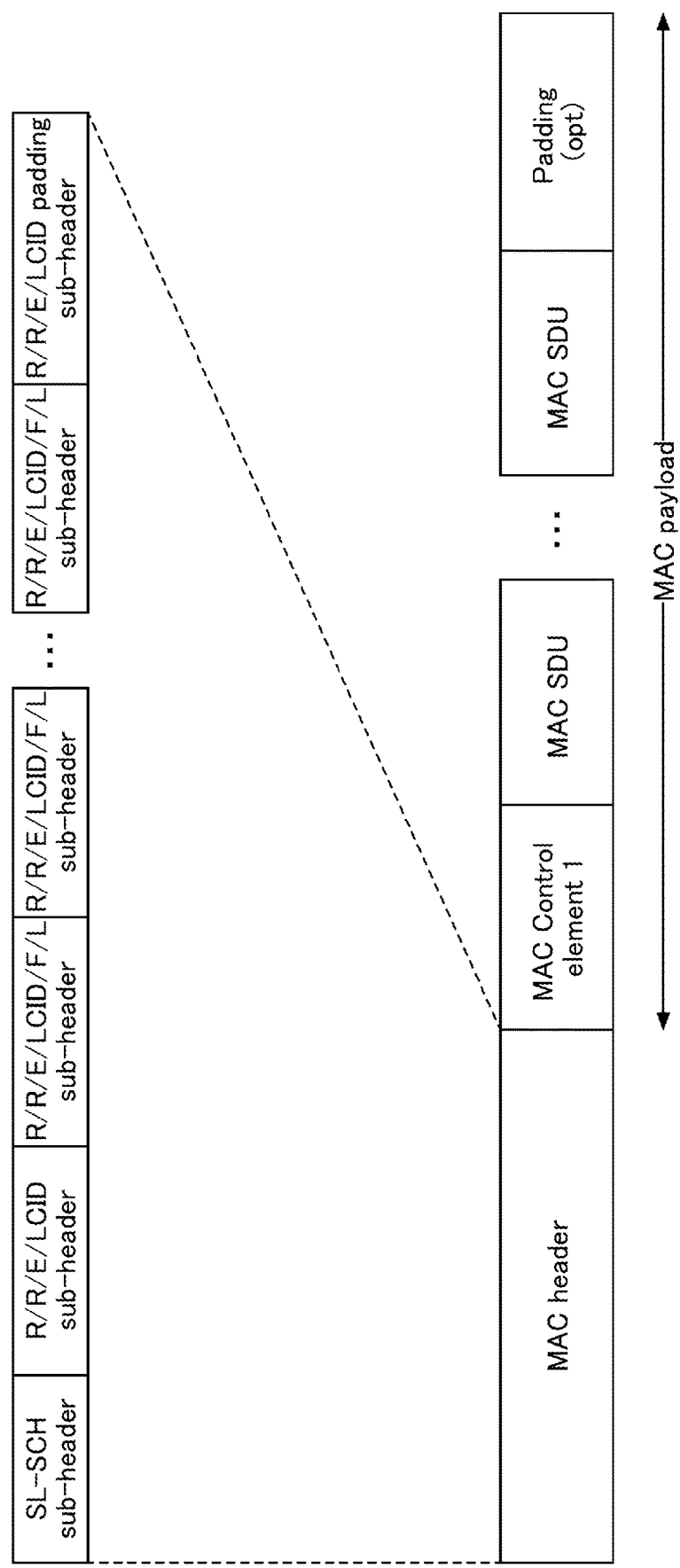
FIG. 3 is a diagram for illustrating a MAC PDU used for sidelink communication.

As illustrated in FIG. 3, a medium access control (MAC) protocol data unit (PDU) used for sidelink includes at least a MAC header, a MAC control element, a MAC service data unit (SDU), and padding. The MAC PDU may include other information. The MAC header includes one a sidelink shared channel (SL-SCH) subheader and one or more MAC PDU subheaders.

Figure 4:
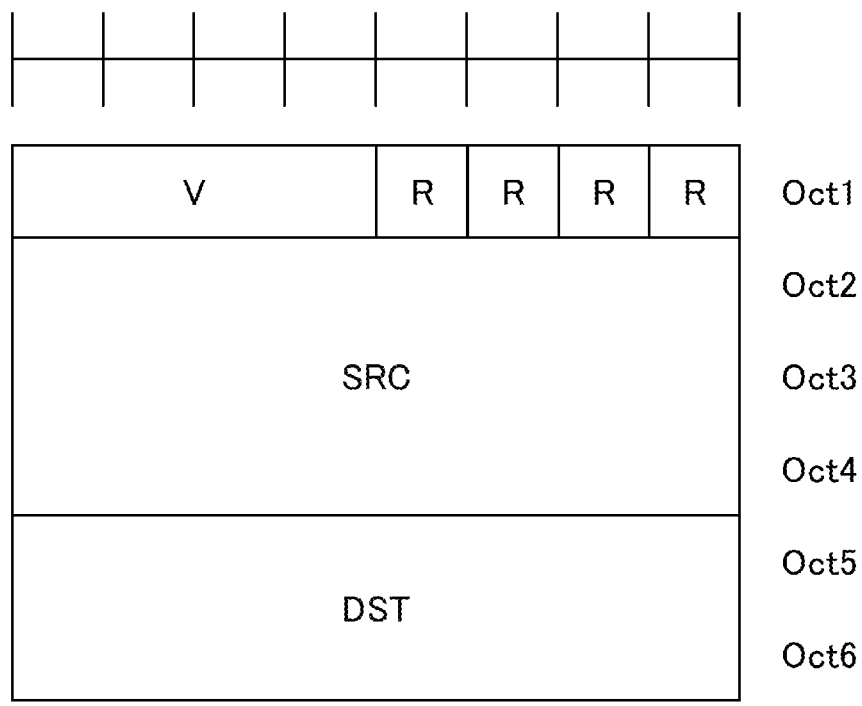
FIG. 4 is a diagram for illustrating a format of an SL-SCH subheader.

As illustrated in FIG. 4, the SL-SCH subheader includes a MAC PDU format version (V), transmission source information (SRC), transmission destination information (DST), reserved bits (R), and the like. V is allocated to the head of the SL-SCH subheader and indicates the MAC PDU format version used by the communication device. Information related to a transmission source is configured in the transmission source information. An identifier related to a ProSe UE ID may be configured in the transmission source information. Information related to a transmission destination is configured in the transmission destination information. Information related to a ProSe Layer-2 Group ID of the transmission destination may be configured in the transmission destination information.

Figure 5:
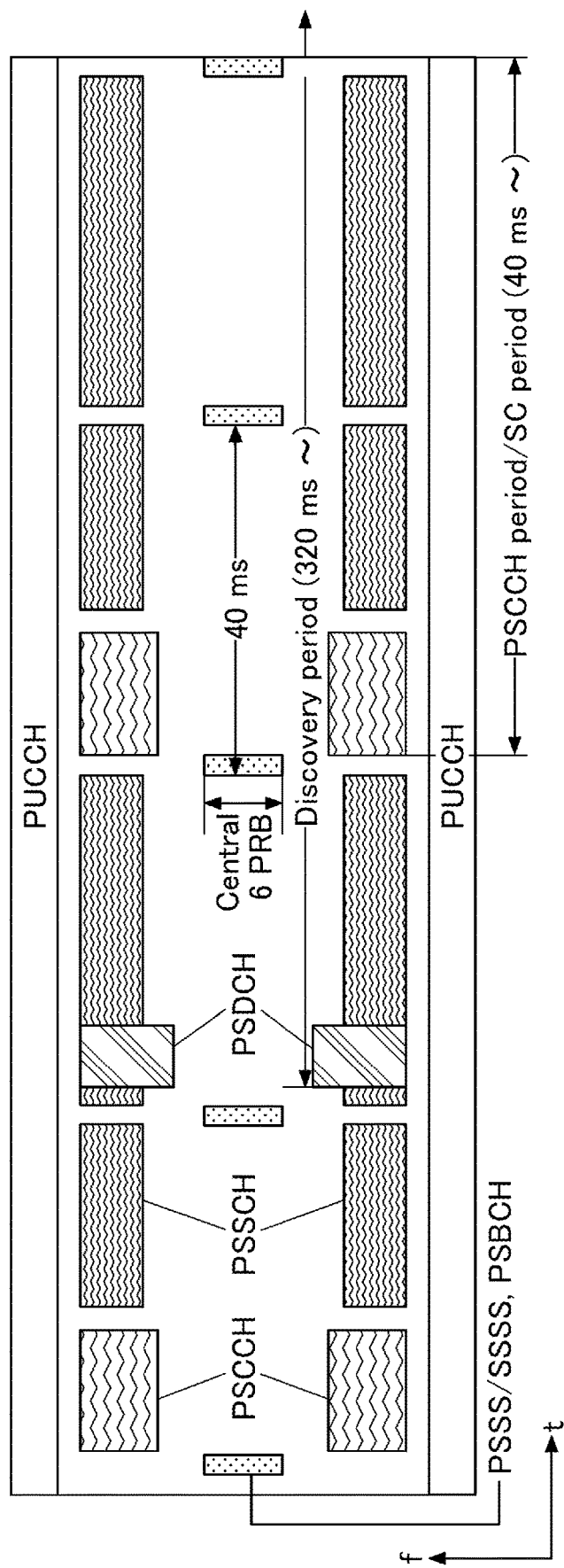
FIG. 5 is a diagram for illustrating an example of a channel structure used in sidelink.

An example of a channel structure of sidelink is illustrated in FIG. 5. As illustrated in FIG. 5, the resource pool of the PSCCH used for "communication" and the resource pool of the PSSCH are allocated. Furthermore, the resource pool of the PSDCH used for "discovery" is allocated at a period longer than a period of a channel of "communication."

A Primary Sidelink Synchronization signal (PSSS) and a secondary sidelink synchronization signal (SSSS) are used as synchronization signals for sidelink. For example, a physical sidelink broadcast channel (PSBCH) for transmitting broadcast information such as a system band of sidelink, a frame number, and resource configuration information is used for an operation outside a coverage. The PSSS/SSSS and the PSBCH are transmitted, for example, in one sub frame. The PSSS/SSSS is also referred to as an SLSS.

V2X assumed in the embodiments is a scheme related to "communication." However, in the embodiments, there may be no distinction between "communication" and "discovery." Furthermore, the technology according to the embodiments may be applied in "discovery."

(System Configuration)

Figure 6:
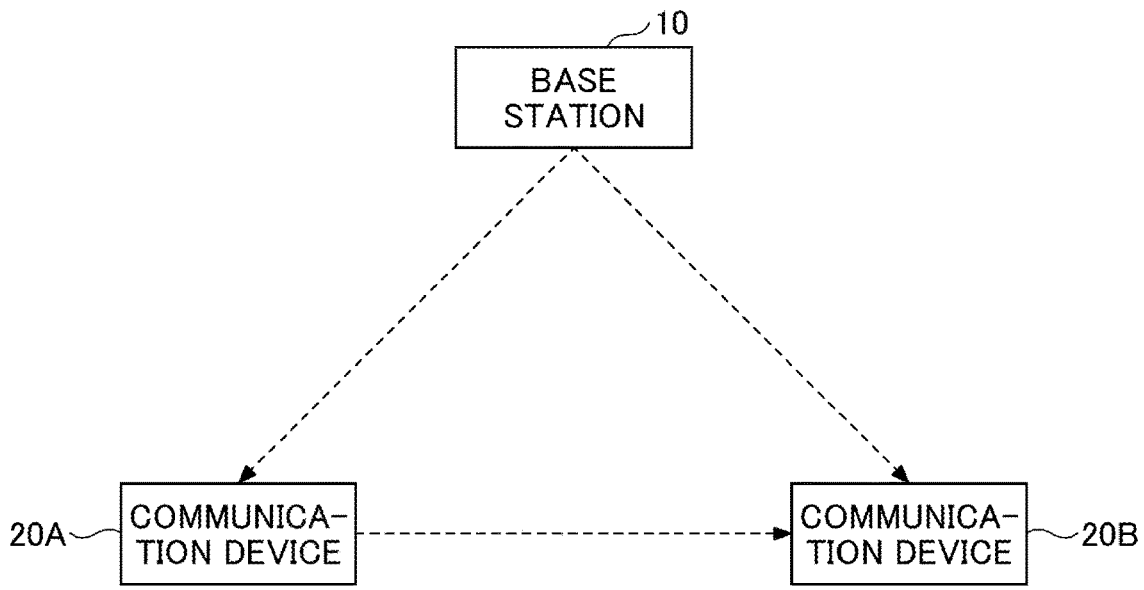
FIG. 6 is a diagram indicating a configuration example of a radio communication system according to an embodiment.

FIG. 6 is a diagram illustrating a configuration example of a radio communication system according to the embodiments. As illustrated in FIG. 6, the radio communication system according to the embodiments includes a base station 10, a communication device 20A, and a communication device 20B. Note that, actually, there may be many communication devices, but FIG. 6 illustrates the communication device 20A and the communication device 20B as an example.

In FIG. 6, it is intended that the communication device 20A is the transmission side, the communication device 20B is the reception side, but both the communication device 20A and the communication device 20B have both the transmission function and the reception function. Hereinafter, when it is not necessary to particularly distinguish the communication devices 20A and 20B, the are referred to simply as a "communication device 20" or a "communication device." FIG. 6 illustrates a case in which the communication device 20A and the communication device 20B are both in the coverage as an example, but an operation according to the embodiments can be applied to a case in which all the communication devices 20 are within the coverage, a case in which some communication devices 20 are within the coverage, and the other communication devices 20 are outside the coverage, and a case in which all the communication devices 20 are outside the coverage.

In the embodiments, the communication device 20 is a device installed in a vehicle such as, for example, an automobile and has a cellular communication function as a UE in LTE or NR and a sidelink function. Furthermore, the communication device 20 has a function of acquiring report information (position, event information, or the like) as in a GPS device, a camera, or various types of sensors. Furthermore, the communication device 20 may be a general mobile terminal (such as a smartphone). Furthermore, the communication device 20 may be an RSU. The RSU may be a UE type RSU having a function of a UE, a BS type RSU (which is also referred to as a gNB type UE) having a function of a base station, or a relay station.

The communication device 20 need not be a device of one housing, and for example, even when various types of sensors are distributed and arranged in a vehicle, a device including various types of sensors is the communication device 20. Furthermore, the communication device 20 may have a function of performing transmission and reception of data with various types of sensors without including various types of sensors.

Furthermore, processing content of sidelink transmission of the communication device 20 is basically similar to processing content of UL transmission in LTE or NR. For example, the communication device 20 scrambles and modulates codewords of transmission data, generates complex-valued symbols, maps the complex-valued symbols (transmission signals) to one or two layers, and performs precoding. Then, the precoded complex-valued symbols are mapped to resource elements, and a transmission signal (for example, CP-OFDM or a DFT-s-OFDM) is generated and transmitted from each antenna port.

The base station 10 has a cellular communication function as a base station 10 in LTE or NR and a function (for example, resource pool configuring, resource allocation, and the like) for enabling communication of the communication device 20 in the embodiments. Furthermore, the base station 10 may be an RSU (a gNB type RSU), a relay station, or a communication device provided with a scheduling function.

Furthermore, in the radio communication system according to the embodiments, a signal waveform used for SL or UL by the communication device 20 may be an OFDMA, an SC-FDMA, or any other signal waveform. Furthermore, in the radio communication system according to the embodiments, as an example, a frame including a plurality of sub frames (for example, 10 sub frames) is formed in a time direction, and it includes a plurality of subcarriers in a frequency direction. One sub frame is an example of one transmission time interval (TTI). Here, the TTI is not necessarily a sub frame. For example, the TTI may be a slot, a mini-slot, or any other unit in the time domain. Furthermore, the number of slots per sub frame may be determined in accordance with the subcarrier spacing. Furthermore, the number of symbols per slot may be 14 symbols.

In the embodiments, the communication device 20 can operate in any mode among a mode 1 which is a mode in which resources are dynamically allocated by the ((enhanced) physical downlink control channel ((E) PDCCH) transmitted from the base station 10 to the communication device, a mode 2 which is a mode in which the communication device autonomously selects a transmission resource from a resource pool, a mode in which resource for SL signal transmission is allocated from the base station 10 (hereinafter referred to as a mode 3), and a mode in which a resource for SL signal transmission is autonomously selected (hereinafter referred to as a mode 4). The mode is configured, for example, in the communication device 20 from the base station 10.

Figure 7:
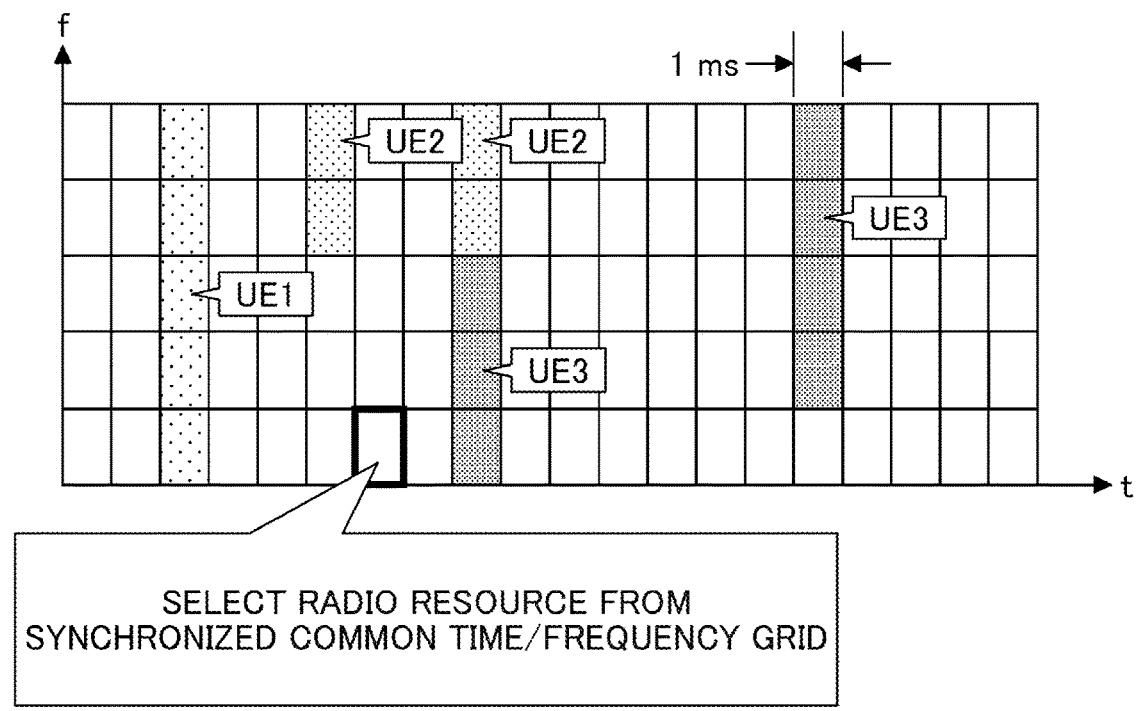
FIG. 7 is a diagram for illustrating a resource selection operation of a communication device.

As illustrated in FIG. 7, the communication device of the mode 4 (indicated by a UE in FIG. 7) selects a radio resource from a synchronized common time/frequency grid. For example, the communication device 20 performs sensing in the background, specifies resources which have a good sensing result and are not reserved for other communication devices as candidate resources, and selects a resource to be used for transmission from the candidate resources.

(Overview of NR V2X)

In NR V2X, transmission modes are specified that are the same as SL transmission mode 3 and SL transmission mode 4 that are specified in LTE V2X.

In the following, an outline of transmission modes defined by NR V2X is described with reference to FIG. 8A to FIG. 8D.

Figure 8A:
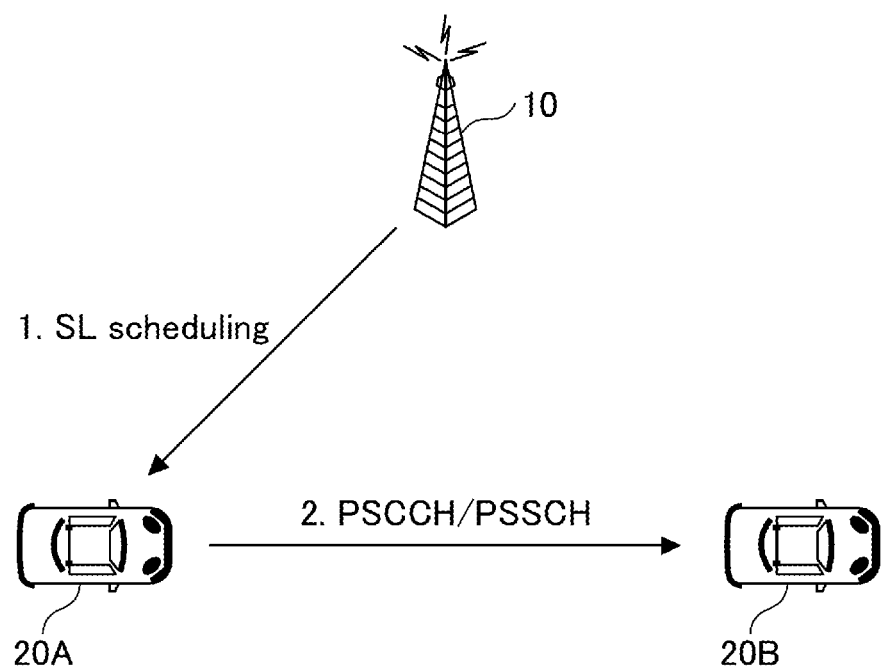
FIG. 8A is a diagram illustrating an outline of SL transmission mode 1 specified in NR V2X.

FIG. 8A is a diagram illustrating an overview of SL transmission mode 1 specified in NR V2X. SL transmission mode 1 specified in NR V2X corresponds to SL transmission mode 3 specified in LTE V2X. In the SL transmission mode 1 specified in NR V2X, the base station 10 schedules a transmission resource and assigns the transmission resource to the transmitting communication device 20A. The communication device 20A transmits a signal to the receiving communication device 20B by using the assigned transmission resource.

Figure 8B:
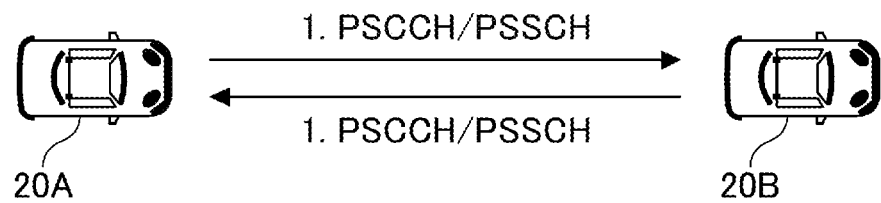
Figure 8C:
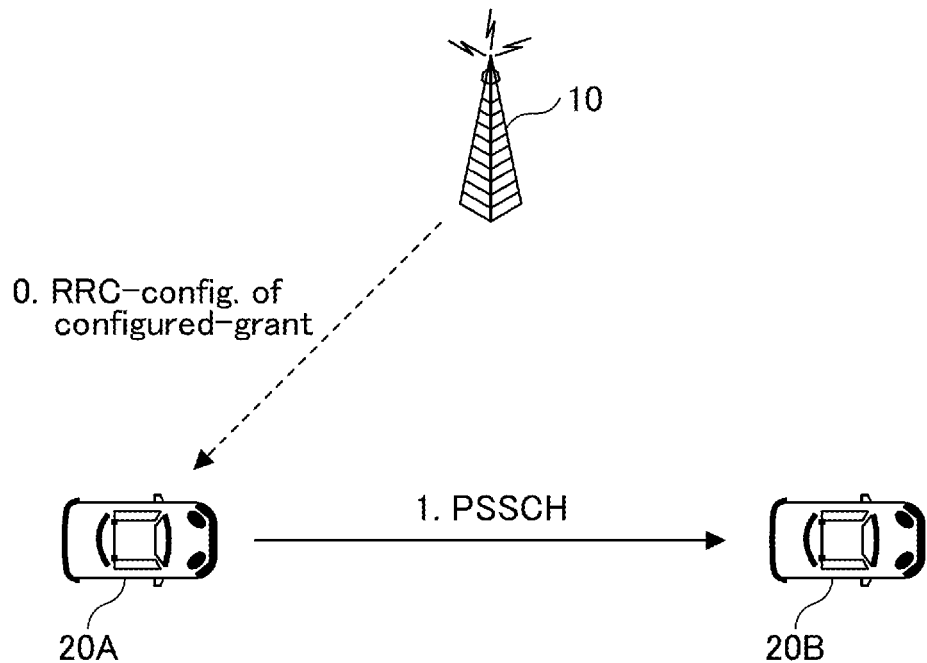
FIG. 8C is a diagram illustrating an outline of SL transmission mode 2c.
Figure 8D:
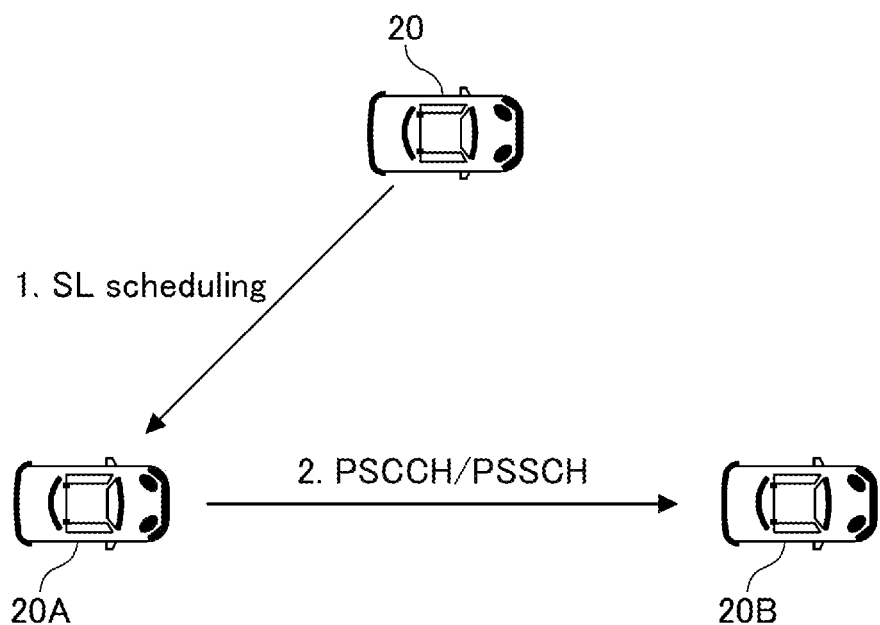
FIG. 8D is a diagram illustrating an outline of SL transmission mode 2d.

FIG. 8B, FIG. 8C and FIG. 8D are diagrams illustrating an overview of SL transmission mode 2 as specified in NR V2X. SL transmission mode 2 specified in NR V2X corresponds to SL transmission mode 4 specified in LTE V2X.

FIG. 8B is a diagram illustrating an overview of SL transmission mode 2a. In SL transmission mode 2a, for example, the transmitting communication device 20A autonomously selects a transmission resource and transmits a signal to the receiving communication device 20B by using the selected transmission resource.

FIG. 8C is a diagram illustrating an outline of SL transmission mode 2c. In the SL transmission mode 2c, for example, the base station 10 preconfigures transmitting resources with a certain period to the communication device 20A, and the communication device 20A transmits a signal to the receiving communication device 20B by using the transmitting resources with the predetermined period. Here, instead of the base station 10 preconfiguring the transmitting resources with the certain period to the communication device 20A, for example, the transmitting resources with the certain period may be configured to the communication device 20A according to a specification.

FIG. 8D is a diagram illustrating an overview of SL transmission mode 2d. In SL transmission mode 2d, for example, the communication device 20 performs an operation that is the same as an operation of the base station 10. Specifically, the communication device 20 schedules transmission resources and assigns the transmission resources to the transmitting communication device 20A. The communication device 20A may perform a transmission to a receiving communication device 20B by using the assigned communication resources. Namely, the communication device 20 may control a transmission by another communication device 20.

Figure 9A:
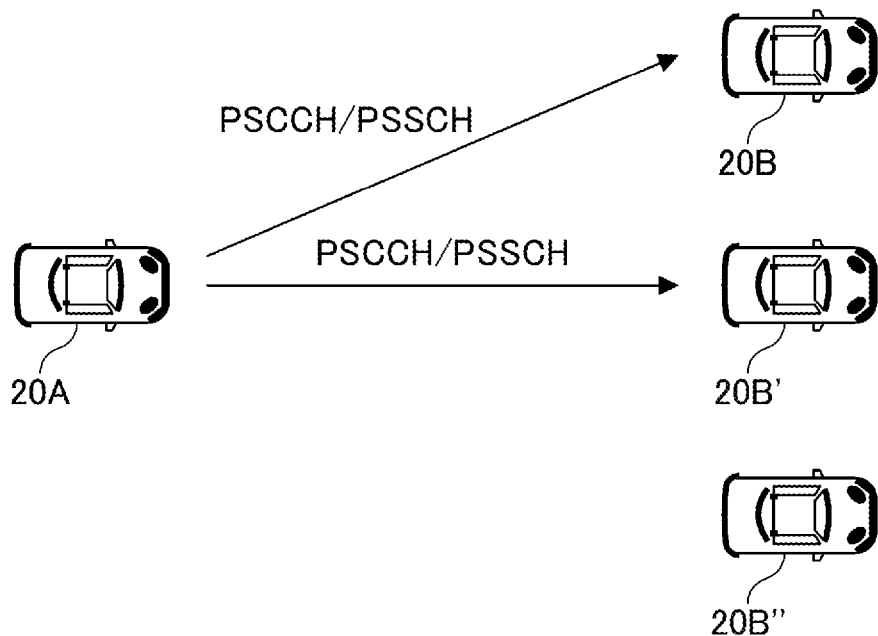
FIG. 9A is a diagram illustrating an example of a unicast PSCCH/PSSCH transmission.
Figure 9B:
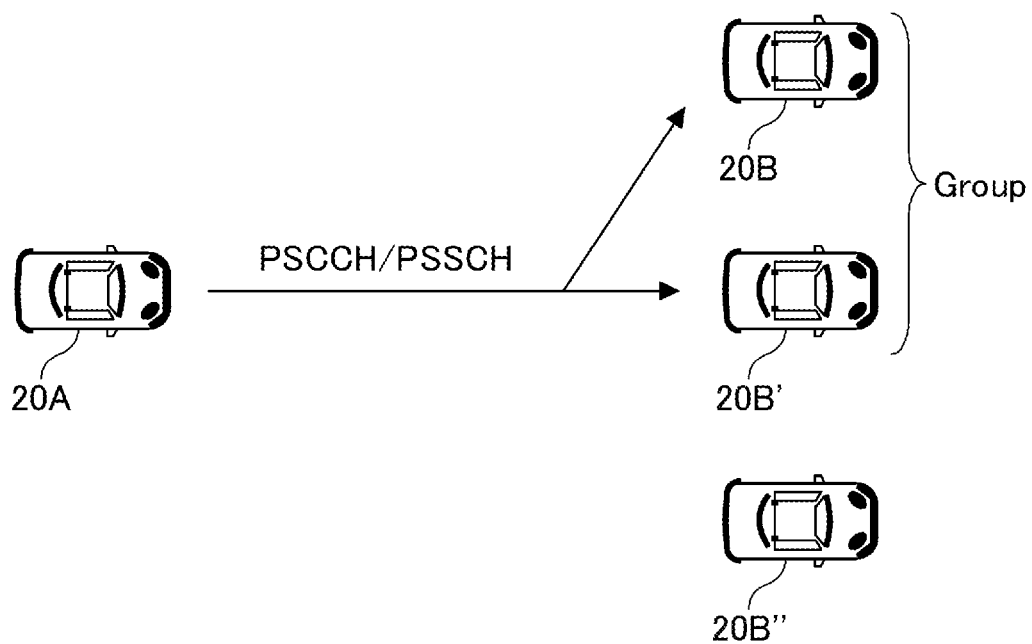
FIG. 9B is a diagram illustrating an example of a groupcast PSCCH/PSSCH transmission.
Figure 9C:
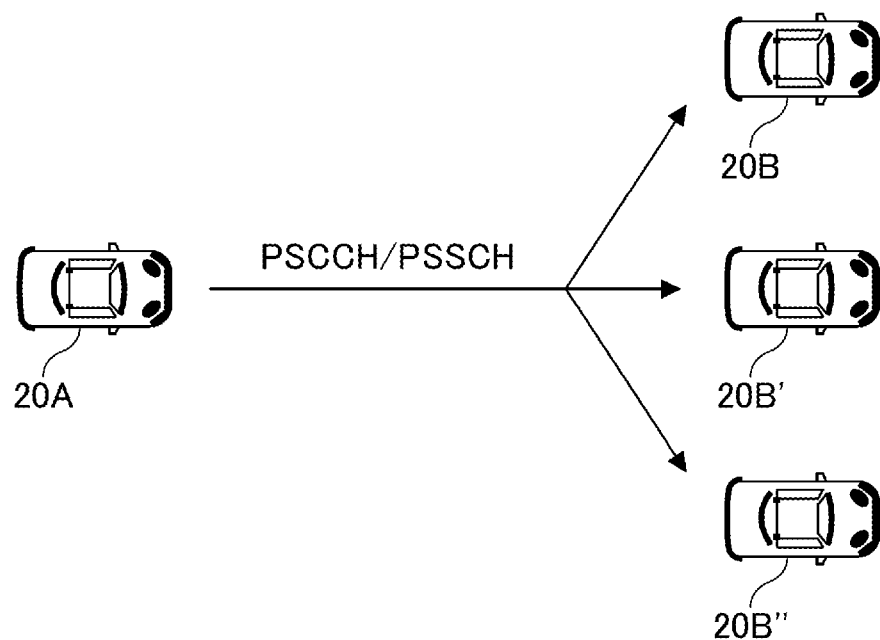
FIG. 9C is a diagram illustrating an example of a broadcast PSCCH/PSSCH transmission.

In the NR, as illustrated in FIG. 9A through FIG. 9C, three communication types, which are unicast, groupcast, and broadcast, are currently studied, as types of communication.

FIG. 9A is a diagram illustrating an example of unicast Physical Sidelink Shared Channel (PSCCH)/Physical Sidelink Control Channel (PSSCH) transmission. Unicast refers, for example, to a one-to-one transmission from the transmitting communication device 20A to the receiving communication device 20B.

FIG. 9B is a diagram illustrating an example of group cast PSCCH/PSSCH transmission. A group cast, for example, refers to a transmission from the transmitting communication device 20A to the communication device 20B and a receiving communication device 20B', which are a group of the receiving communication apparatuses 20.

FIG. 9C is a diagram illustrating an example of a broadcast PSCCH/PSSCH transmission. Broadcast refers, for example, to a transmission from the transmitting communication device 20A to the communication device 20B, the communication device 20B', and a communication device 20B" which are all the receiving communication apparatuses 20 within a predetermined range.

<Multi-Numerology>

In order to support a wide frequency and a use case in 5G, it is necessary to support a plurality of numerologies (radio parameters such as subcarrier spacing and a symbol length). For this reason, it is effective to design variable parameters to be scalable, using the LTE numerology as a reference. Under this concept, multi-numerology of NR has been introduced. Specifically, reference subcarrier spacing is the same as the subcarrier spacing of LTE, and is assumed to be 15 kHz. By multiplying the reference subcarrier spacing by a power of 2, other subcarrier spacings are specified.

A plurality of OFDM numerologies, that is, subcarrier spacing configurations $\mu$ are specified. Specifically, subcarrier spacings $\Delta f$=15 kHz, 30 kHz, 60 kHz, 120 kHz, and 240 kHz are specified for $\mu$=0, 1, 2, 3, and 4.

Here, the number of OFDM symbols included in one slot is 14 for any of the subcarrier spacing configurations $\mu$=0, 1, 2, 3, and 4. However, for the subcarrier spacing configurations $\mu$=0, 1, 2, 3, and 4, the number of slots included in one frame is 10, 20, 40, 80, and 160, and the number of slots included in one sub frame are 1, 2, 4, 8, and 16. Here, since a frame length is 10 ms, a slot length is 1 ms, 0.5 ms, 0.25 ms, 0.125 ms, and 0.0625 ms for the subcarrier spacing configurations $\mu$=0, 1, 2, 3, and 4. Since the number of OFDM symbols included in one slot is 14 for any of the subcarrier spacing configurations $\mu$=0, 1, 2, 3, and 4, the OFDM symbol length differs for each subcarrier spacing configuration. For the subcarrier spacing configuration $\mu$=0, 1, 2, 3, and 4, the OFDM symbol length is (1/14) ms, (0.5/14) ms, (0.25/14) ms, (0.125/14) ms, and (0.0625/14) ms. By reducing the slot length and the OFDM symbol length as described above, low delay communication can be realized.

<Dynamic TDD>

Similar to LTE, in NR, both frequency division duplex (FDD) and time division duplex (TDD) are supported. In particular, in TDD, dynamic TDD (flexible duplex) in which a communication direction (UL/DL) is dynamically switched in the time domain (or the frequency domain) for efficient traffic accommodation is supported.

In TDD of LTE, a communication direction is configured by a UL/DL configuration in a static/semi-static manner. In contrast, in TDD of NR, a communication direction is dynamically switched depending on a traffic state in a cell.

In Table 11.1.1-1 of Non-Patent Document 1, various slot formats are specified. According to Non-Patent Document 1, OFDM symbols in one slot are classified into downlink (written as D in Table 11.1.1-1), flexible (written as F in Table 11.1.1-1), or uplink (written as U in Table 11.1.1-1). As illustrated in Table 11.1.1-1, in the slot format of NR, allocation of DL and UL is performed in units of symbols. In contrast, in the case of LTE, allocation of DL and UL is performed in units of sub frames.

By the signaling of allocation information for allocating any one slot format illustrated in Table 11.1.1-1 to each of a plurality of slots included in a frame, dynamic TDD (flexible TDD) can be achieved in which the communication direction (UL/DL) is dynamically switched in the time domain (or the frequency domain).

In the RAN meeting of 3GPP, in NR-V2X, there is an agreement regarding using the same frequency (that is, license band) as that of NR-Uu (an interface between a 5G user equipment and a 5G radio access network (RAN)).

For this reason, in a case where a time division duplex configuration (TDD configuration) is configured in the NR-Uu, a part of the TDD configuration is used in a sidelink transmission.

Figure 10:
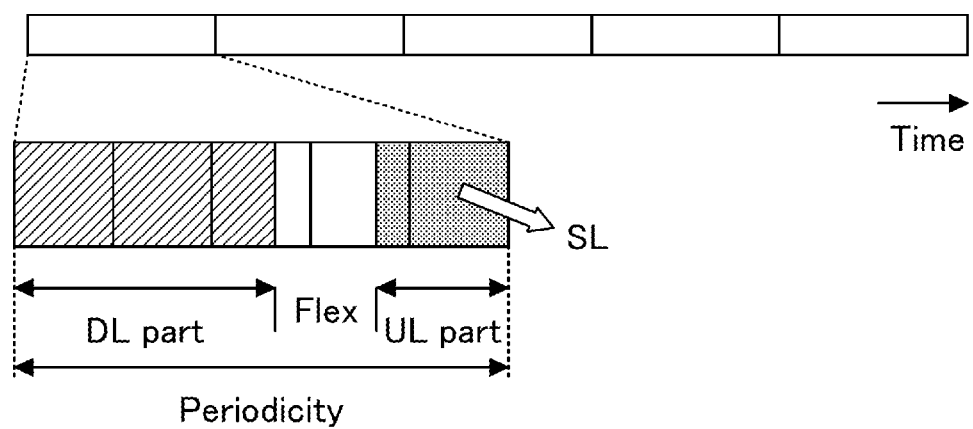
FIG. 10 is a diagram illustrating an example of a TDD configuration.

For example, FIG. 10 is a diagram illustrating an example of the TDD configuration. In a part that is illustrated as the periodicity in FIG. 10, a downlink (DL) part, uplink (UL) part, and a flexible (Flex) part are included. In the DL part, the UL part, and the Flex part, for example, only the UL part, or the UL part and the Flex part can be used in the sidelink communication.

In a situation where the TDD configuration is configured in the NR-Uu, for example, in a case where the sidelink communication is performed between the communication device 20A and the communication device 20B by using only the UL part of the TDD configuration or by using the UL part and the Flex part, it is necessary that the communication device 20A and the communication device 20B each obtains a slot format in advance. That is, the communication device 20A and the communication device 20B determines a TDD configuration by a notification of a slot format, and the communication device 20A and the communication device 20B can determine an uplink symbol position and a flexible symbol position in the slot.

In the NR-Uu, the TDD configuration or the slot format described above is notified to the user equipment from the RAN by a system information block (SIB) or radio resource control (RRC) signaling.

In the case of the sidelink communication of the LTE, the notification a TDD UL-DL configuration via the sidelink is performed through a physical sidelink broadcast channel (PSBCH). Accordingly, for NR, it is assumed that the notification of the TDD UL-DL configuration via the sidelink is performed through the PSBCH.

It is assumed that such a transmission of a notification of the TDD UL-DL configuration via the sidelink is performed, for example, in a case where the communication device 20 in the coverage of the base station 10 transmits a notification of the TDD UL-DL configuration to the communication device 20 outside the coverage of the base station 10.

In the NR, a degree of freedom in configuring an uplink symbol, a flexible symbol, and a downlink symbol in one slot is high. In this case, it is considered that an information amount of the slot format to be notified through the PSBCH increases. That is, in a case where the slot format is provided by notification through the PSBCH, it is necessary to increase the amount of resource that is allocated to the PSBCH. Accordingly, an efficiency of utilizing the resource may decrease. In addition, if an amount of resource that is assigned to the PSBCH is attempted to be minimized, for example, it may be necessary to use a multilevel modulation scheme at a high level so that a transmission bit rate increases, and in such a case, the coverage may be narrowed, and thus the efficiency of the sidelink communication may decrease.

(TDD Configuration of NR-Uu)

The TDD configuration of the NR-Uu can be configured by a semi-static method or a dynamic method.

(Semi-Static Configuration Method)

In a method of semi-statically configuring a TDD configuration, a TDD configuration is configured by using a higher layer signal, such as RRC signaling. The TDD configuration can be configured as a cell-specific configuration or a user equipment-specific (UE-specific) configuration. For a cell-specific TDD configuration, one or two patterns of a DL-Flex-UL configuration are configured for one period. For a user equipment-specific TDD configuration, for each slot of one period, any one of DL-Flex-UL configuration patterns is configured.

For example, as illustrated in FIG. 10, a user equipment can be configured with a TDD configuration, by transmitting a DL part, a Flex part, a UL part, and a Periodicity by RRC signaling, so that the DL part, the Flex part, and the UL part occur in each period. For example, any one of 0.5 ms, 0.625 ms, 1 ms, 1.25 ms, 2 ms, 5 ms, and 10 ms can be configured as the periodicity.

(Dynamic Configuration Method)

Figure 11:
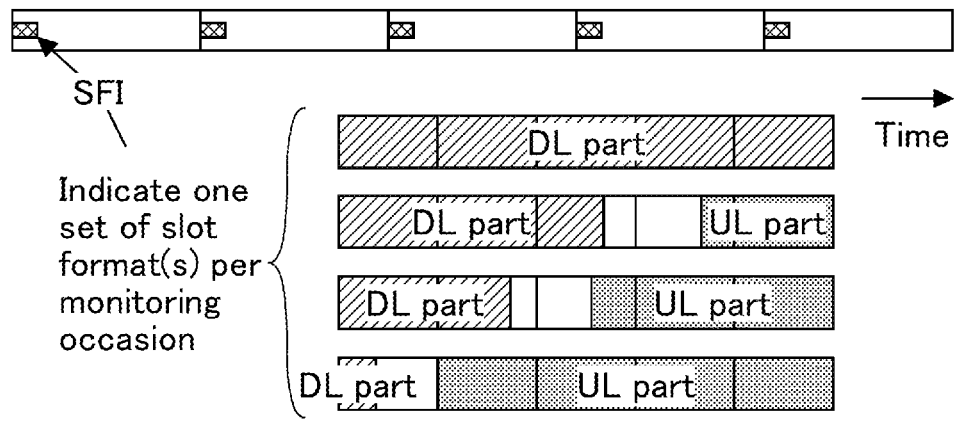
FIG. 11 is a diagram illustrating an example of a method of configuring a dynamic TDD configuration.

In a method of dynamically configuring a TDD configuration, as illustrated in FIG. 11, for example, a TDD configuration is dynamically configured for a user equipment by configuring a plurality of candidate patterns of a DL-Flex-UL configuration for the user equipment with RRC signaling, and by transmitting a notification of a pattern from among the plurality of candidate patterns by using Downlink Control Information (DCI) that is referred to as a slot-format indicator (SFI). Note that, for example, any of one slot, 2 slots, 4 slots, 5 slots, 8 slots, 10 slots, 16 slots, and 20 slots can be configured as the periodicity of the TDD configuration.

FIG. 12 is a diagram illustrating an example of the slot format that is used in the method of dynamically configuring a TDD configuration. Symbol numbers (0, 1, 2, . . . , 13) in one slot are arranged in a horizontal direction of a table illustrated in FIG. 12. For example, for the slot format 0 in the table illustrated in FIG. 12, all symbols in one slot are assigned to the downlink. For a slot format 1, all symbols in one slot are assigned to the uplink.

For example, slot formats of $2^n$ from among the slot formats of 56 patterns as illustrated in FIG. 12 are configured for the user equipment by higher layer signaling. Subsequently, one slot format from among the slot formats of $2^n$ is indicated by the DCI that is referred to as the SFI. A TDD configuration can be dynamically configured for the user equipment by this method. Here, n is a number of bits in the SFI (DCI).

FIG. 13 is a diagram illustrating an example of parameters for notifying the slot format, in the method of dynamically configuring a TDD configuration. In a parameter of "SlotFormatCombination" illustrated in FIG. 13, "SlotFormats" is included, and in the "SlotFormats", as illustrated in FIG. 12, a sequence of values that are selected from 0 to 55 indicating the slot formats is stored. For example, in the "SlotFormats," the sequence of the slot formats {0, 0, 3, 1, 1} may be stored. In the method of dynamically configuring a TDD configuration described above, for example, one or more "SlotFormatCombination" are configured, and a notification is dynamically transmitted to the user equipment by the SFI to indicate which "SlotFormatCombination" from among the one or more "SlotFormatCombination" is to be used.

FIG. 14 is a diagram illustrating an example of parameters for notifying the TDD configuration, in the method of semi-statically configuring a TDD configuration. A parameter of "TDD-UL-DL-Pattern" illustrated in FIG. 14 corresponds to information for configuring the TDD configuration. The "nrofDownlinSlots" included in the "TDD-UL-DL-Pattern" specifies the number of downlink slots included in one period, "nrofDownlinkSymbols" specifies the number of downlink symbols included in one period, "nrofUplinkSlots" specifies the number of uplink slots included in one period, and "nrofUplinkSymbols" specifies the number of uplink symbols included in one period. The "dl-UL-TransmissionPeriodicity" included in the "TDD-UL-DL-Pattern" specifies the period of the TDD configuration. When the period and the numerology are determined, the number of slots included in one period is determined, and the downlink part and the uplink part in one period are explicitly determined by the parameters described above. A part between the downlink part and the uplink part is implicitly determined as the Flex part.

(Method 1 of Reducing Information Amount in Method of Semi-Statically Configuring TDD Configuration)

When a TDD configuration is configured in the NR-Uu, in particular, in order to prevent the sidelink communication from interfering with downlink communication, a part that is assigned to the downlink is not used in the sidelink communication in many cases. That is, in general, a part that can be used in the sidelink communication is a part that is assigned to the uplink, in the TDD configuration. Accordingly, in the TDD configuration, information indicating the configuration of a part that is not capable of being used in the sidelink communication, that is, information indicating the configuration of the part that is assigned to the downlink is not transmitted, and thereby an information amount at the time of notifying the TDD configuration through the PSBCH can be reduced. That is, just the information of the part that can be used in the sidelink communication may be notified through the PSBCH.

For example, in the parameter of the "TDD-UL-DL-Pattern" illustrated in FIG. 14, at least the "nrofDownlinSlots" and the "nrofDownlinkSymbols" are parameters for specifying the part that is not used in the sidelink communication, and thus, in a case where the TDD configuration is notified from the communication device 20 to another communication device 20 through the PSBCH, it may be not necessary to notify the "nrofDownlinSlots" and the "nrof- DownlinkSymbols". Accordingly, in the method 1 of reducing an information amount in the method of semi-statically configuring a TDD configuration, for example, the communication device 20 may transmit, to the other communication device 20 through the PSBCH, a notification of only the uplink part in the TDD configuration, that is, only the "nrofUplinkSlots", the "nrofUplinkSymbols", and the "dl-UL-TransmissionPeriodicity" in the parameter of the "TDD-UL-DL-Pattern."

Note that, in a case where the TDD configuration is configured in the NR-Uu, the Flex part may also be used in the sidelink communication, in addition to the part that is assigned to the uplink, in the TDD configuration. In such a case, the communication device 20 may transmit information indicating the configuration of the Flex part to another communication device 20 through the PSBCH, in addition to the information indicating the configuration of the part that is assigned to the uplink, in the TDD configuration.

However, in an example of the parameter of the "TDD-UL-DL-Pattern" illustrated in FIG. 14, the Flex part is implicitly indicated as a part other than the part that is assigned to the uplink and the part that is assigned to the downlink. Accordingly, in the case of transmitting information indicating the configuration of the Flex part, in addition to the information indicating the configuration of the part that is assigned to the uplink, without transmitting the information indicating the configuration of the part that is assigned to the downlink, in the TDD configuration, a parameter indicating the configuration of the Flex part, for example, "nrofFlexSlots" and "nrofFlexSymbols" may be defined, and a notification of "nrofFlexSlots" and "nrofFlexSymbols" may be transmitted to another communication device 20 through the PSBCH, along with the "nrofUplinkSlots", the "nrofUplinkSymbols", and the "dl-UL-TransmissionPeriodicity" described above.

Alternatively, in a case where the Flex part is not distinguished from the part that is assigned to the uplink, a parameter indicating the configuration of the Flex part and the part that is assigned to the uplink, for example, "nrofSLSlots" and "nrofSLSymbols" may be defined, and a notification of "nrofSLSlots" and "nrofSLSymbols" may be transmitted to another communication device 20 through the PSBCH, along with the "dl-UL-TransmissionPeriodicity". Note that, the name of the parameter is not limited thereto.

(Method 2 of Reducing Information Amount in Method of Semi-Statically Configuring TDD Configuration)

When a TDD configuration is configured in the NR-Uu, in a method 2 of reducing the information amount for notifying the TDD configuration on the sidelink, the communication device 20, first, configures in advance the part that can be used in the sidelink communication (for example, one or a plurality of candidate patterns indicating the part that is assigned to the uplink (one or a plurality of candidate patterns corresponding to the number of uplink slots, and the like)), in the TDD configuration. Subsequently, the communication device 20 selects a pattern corresponding to the part that can be used in the sidelink communication, in the TDD configuration that is configured in the NR-Uu (for example, the part that is assigned to the uplink (the number of uplink slots, and the like)), from the candidate patterns that are configured in advance, and transmits a notification of the selected pattern to another communication device 20 through the PSBCH.

For example, the communication device 20 configures in advance the following candidate patterns. Alternatively, the following candidate patterns are defined in the specification.

pattern00={**U}, pattern01={*UU}, and pattern10={**UUU}

In such a case, when the pattern corresponding to the part that is assigned to the uplink, in the TDD configuration that is configured in the NR-Uu, is {***UU} (that is, a case where there are two the uplink slots), the communication device 20 transmits a notification of an index 01 corresponding to the pattern01 to another communication device 20 through the PSBCH, and thereby the slot configuration that can be used in the sidelink communication can be provided by notification. In such an example, it is possible to notify that in a slot configuration including five slots, a slot that is provided on the tail with respect to time or the second slot from the last can be used in the sidelink communication.

Similar to the method 1 of reducing the information amount in the method of semi-statically configuring a TDD configuration described above, the Flex part may also be used in the sidelink communication, in addition to the part that is assigned to the uplink, in the TDD configuration. When the part that is assigned to the uplink is distinguished from the Flex part, for example, the pattern candidate of {FUU} may be configured in advance. When the part that is assigned to the uplink is not distinguished from the Flex part, for example, the pattern candidate of {SSS} may be configured in advance.

Note that, the methods 1 and 2 of reducing the information amount in the method of semi-statically configuring a TDD configuration described above can be applied not only to the method of semi-statically configuring a TDD configuration but also to the method of dynamically configuring a TDD configuration.

(Method 1 of Reducing Information Amount in Method of Dynamically Configuring TDD Configuration)

Next, a method 1 of reducing an information amount for notifying a TDD configuration on the sidelink is described for a case in which the method of dynamically configuring a TDD configuration is applied to the NR-Uu. When the method of dynamically configuring a TDD configuration is applied to the NR-Uu, candidate slot formats are configured for the user equipment, and then, a slot format to be used is dynamically indicated by the SFI.

In such a case, in order to reduce the information amount for notifying the TDD configuration on the sidelink, first, slot formats are grouped. The grouping may be performed based on whether the symbols that can be used in the sidelink communication are the same.

An example of grouping the slot format is described with reference to FIG. 15.

As described above, in general, the part that can be used in the sidelink communication is the part that is assigned to the uplink, in the TDD configuration. Accordingly, the slot formats illustrated in FIG. 15 can be grouped based on the number of uplink symbols.

As illustrated in FIG. 15, in slot formats 0, 2 to 7, and 16 to 18, no uplink symbol is included. Accordingly, the slot formats 0, 2 to 7, and 16 to 18 can be grouped to a group 0.

In addition, in FIG. 15, a slot format 1 includes only the uplink symbol. Accordingly, the slot format 1 can be grouped as a group 1.

Furthermore, in FIG. 15, the slot formats 8, 19 to 21, 28 to 30, and 43 include only one uplink symbol. Accordingly, the slot formats 8, 19 to 21, 28 to 30, and 43 can be grouped as a group 2.

As described above, the slot formats illustrated in FIG. 15 can be grouped into a plurality of groups, that is, the groups 0, 1, 2, □, based on the number of uplink slots included in the slot format.

For example, when a TDD configuration that is applied to the NR-Uu is represented by {0, 0, 6, 8, 1, 0, 0, 28, 1, 1} in accordance with the slot format of FIG. 15, the communication device 20 can notify the position of a symbol that can be used in the sidelink (the position of the uplink symbol) by transmitting a notification of {0, 0, 0, 2, 1, 0, 0, 2, 1, 1} to another communication device 20 by using the index of the group. That is, the number of candidates of the slot format is decreased by the grouping. Accordingly, the information amount can be reduced.

When the part that can be used in the sidelink communication is the part that is assigned to the uplink and the Flex part, in the TDD configuration, the grouping may be performed based on the number of uplink symbols and the number of flexible symbols for performing the above-described grouping. For example, in the table of FIG. 15, the slot formats 8 to 15 may be grouped as the same group.

(Method 2 of Reducing Information Amount in Method of Dynamically Configuring TDD Configuration)

In a method 2 of reducing the information amount in the method of dynamically configuring a TDD configuration, all of the slot formats that are defined in the NR-Uu are transmitted through the PSBCH, and among them, only a common part that can be used in the sidelink communication (for example, the uplink part, or the common uplink part and the common Flex part) is used in the sidelink communication. For transmitting all of the slot formats that are defined in the NR-Uu through the PSBCH, the method 1 of reducing the information amount in the method of dynamically configuring a TDD configuration described above may be applied.

For example, similar to the method 1 of reducing the information amount in the method of dynamically configuring a TDD configuration described above, suppose that a group index set of {0, 0, 0, 2, 1, 0, 0, 2, 1, 1} is provided by notification, and a group index set of {0, 0, 0, 0, 0, 0, 0, 1, 1, 1} is provided by notification. The uplink part is common in two group index sets in that the group index of the slot on the tail end is 1 and the group index of the second slot from the tail end is 1. Accordingly, only a part of {1, 1} on the tail end may be used in the sidelink communication.

When the method of dynamically configuring a TDD configuration is applied to the NR-Uu, a slot format to be applied to the NR-Uu is dynamically changed. In such a case, if a part that is supposed to be used in the downlink is used in the sidelink, the sidelink communication may adversely affect the NR-Uu. Accordingly, only a part that is defined as the uplink is used in the sidelink, and thereby a possibility that the sidelink communication adversely affects the NR-Uu can be decreased.

(Method 3 of Reducing Information Amount in Method of Dynamically Configuring TDD Configuration)

In a method 3 of reducing the information amount in the method of dynamically configuring a TDD configuration, one slot format is determined such that the part that can be used in the sidelink communication (e.g., the uplink part (or the uplink part and the Flex part)) is common, with respect to all of the slot formats that are defined in the NR-Uu, and only the one slot format may be transmitted through the PSBCH.

Note that, the methods 1 to 3 of reducing the information amount in the method of dynamically configuring a TDD configuration described above may be applied to the method of semi-statically configuring a TDD configuration.

Note that, with regard to "TDD UL-DL config" or "slot format," an applicable parameter is not limited to the parameters that are described in the above-described example. For example, "SlotFormatIndicator," "SlotFormatCombinationsPerCell," "SlotFormatCombination," "SlotFormats," "TDD-UL-DL-ConfigCommon," "TDD-UL-DL-Pattern," "TDD-UL-DL-SlotConfig," and the like may be applied, or a new parameter for the sidelink may be defined, and the new parameter may be applied.

In the example described above, the communication device 20 transmits the notification of the TDD configuration or the slot format through the PSBCH, but embodiments of the present invention are not limited to the embodiments described above. The communication device 20 may transmit a notification of a TDD configuration by at least one of the physical sidelink control channel (PSCCH), the physical sidelink shared channel (PSSCH), and a physical sidelink feedback channel (PSBCH).

For example, remaining minimum system information (RMSI) in the NR-Uu may be defined for the sidelink (SL-RMSI (SL-SIB)), and the SL-RMSI (SL-SIB) may be transmitted by the PSSCH. In this case, a notification of the position of the PSCCH may be transmitted through the PSBCH, a notification of the position of the PSSCH may be transmitted through the PSCCH, and the SL-RMSI (SL-SIB) may be transmitted through the PSSCH.

(Device configuration)

Next, a functional configuration example of each of the base station 10 and the communication device 20 that execute the processes and the operation described so far is described.

<Base Station 10>

Figure 16:
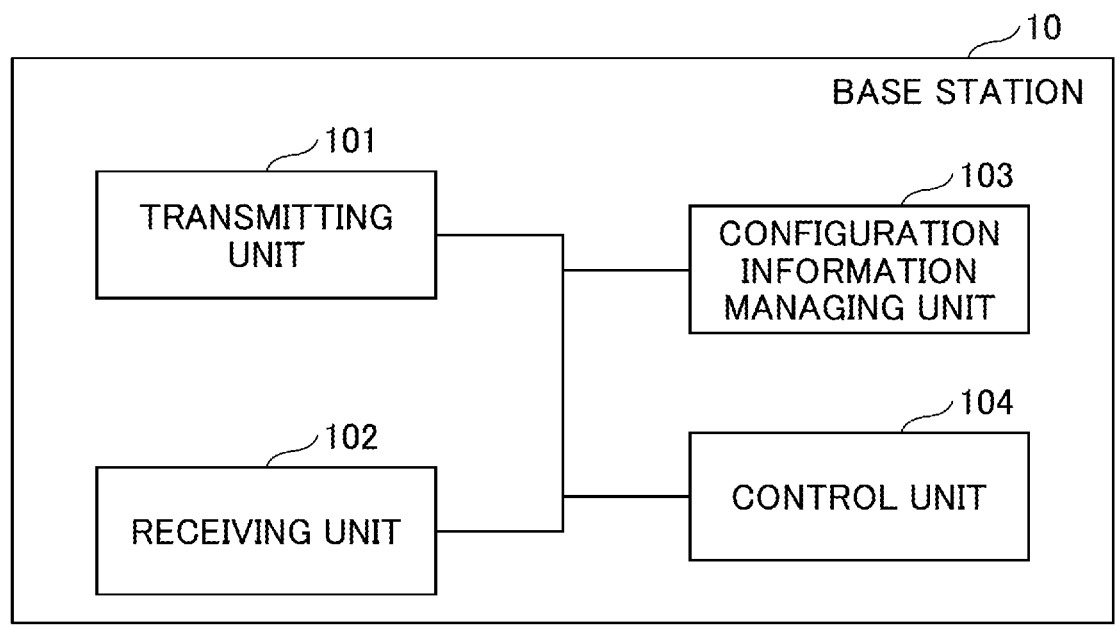
FIG. 16 is a diagram illustrating an example of a functional configuration of a base station according to an embodiment.

FIG. 16 is a diagram illustrating an example of a functional configuration of the base station 10. As illustrated in FIG. 16, the base station 10 includes a transmitting unit 101, a receiving unit 102, a configuration information managing unit 103, and a control unit 104. The functional configuration illustrated in FIG. 16 is only an example. As long as the operation according to the embodiments can be executed, the functional division and the name of the functional unit may be any division and name. Furthermore, the transmitting unit 101 may be referred to as a transmitter, and the receiving unit 102 may be referred to as a receiver.

The transmitting unit 101 has a function of generating a signal to be transmitted to the communication device 20 side and transmitting the signal wirelessly. The receiving unit 102 has a function of receiving various types signals transmitted from the communication device 20 and acquiring, for example, information of an upper layer from the received signals. Furthermore, the receiving unit 102 has a function of measuring the received signal and acquiring a quality value.

The configuration information managing unit 103 stores pre-configured configuration information, configuration information received from the communication device 20, and the like. Furthermore, configuration information related to transmission may be stored in the transmitting unit 101, and configuration information related to reception may be stored in the receiving unit 102. The control unit 104 controls the base station 10. The function of the control unit 104 related to transmission may be included in the transmitting unit 101, and the function of the control unit 104 related to reception may be included in the receiving unit 102.

For example, the configuration information managing unit 103 may include information indicating a TDD configuration and a slot format. For example, for semi-statically configuring a TDD configuration, the control unit 104 may read out the TDD configuration or the slot format to be configured from the configuration information managing unit 103, and the control unit 104 may include the TDD configuration or the slot format in a signal to be transmitted by the transmitting unit 101. Furthermore, for example, for dynamically configurating a TDD configuration, the control unit 104 may configure a plurality of candidate patterns of a DL-Flex-UL configuration for the communication device 20 by causing the transmitting unit 101 to transmit a signal.

<Communication Device 20>

Figure 17:
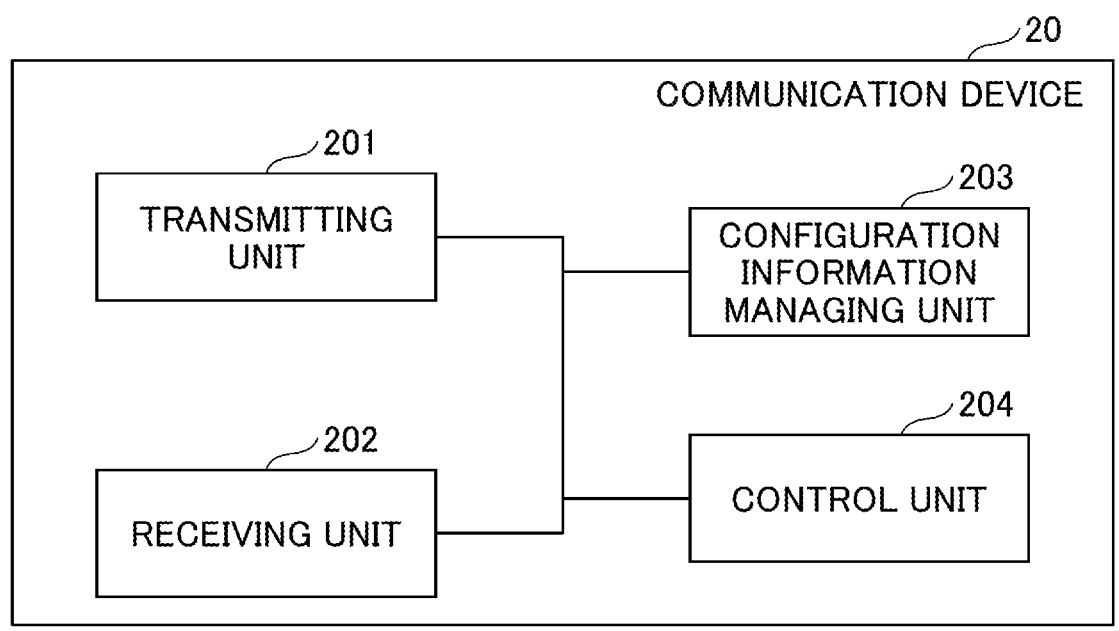
FIG. 17 is a diagram illustrating an example of a functional configuration of a communication device according to an embodiment.

FIG. 17 is a diagram illustrating an example of a functional configuration of the communication device 20. As illustrated in FIG. 17, the communication device 20 includes a transmitting unit 201, a receiving unit 202, a configuration information managing unit 203, and a control unit 204. The functional configuration illustrated in FIG. 17 is only an example. As long as the operation according to the embodiments can be executed, the functional division and the name of the functional unit nay be any division and name. Furthermore, the transmitting unit 201 may be referred to as a transmitter, and the receiving unit 202 may be referred to as a receiver. Furthermore, the communication device 20 may be the communication device 20A on the transmission side or the communication device 20B on the reception side.

The transmitting unit 201 generates a transmission signal from transmission data and transmits the transmission signal wirelessly. The receiving unit 202 wirelessly receives various types of signals, and acquires a signal of an upper layer from the received signal of the physical layer. Furthermore, the receiving unit 202 has a function of measuring the received signal and acquiring a quality value.

The configuration information managing unit 203 stores pre-configured configuration information, configuration information received from the base station 10, and the like. Furthermore, configuration information related to transmission may be stored in the transmitting unit 201, and configuration information related to reception may be stored in the receiving unit 202. The control unit 204 controls the communication device 20. Furthermore, the function of the control unit 204 related to transmission may be included in the transmitting unit 201, and the function of the control unit 204 related to reception may be included in the receiving unit 202.

When a TDD configuration is semi-statically configured, the receiving unit 202 receives a higher layer signal, such as RRC signaling, from the base station 10. The control unit 204 sets a TDD configuration based on a higher layer signal received by the receiving unit 202. The transmitting unit 201 may transmit, to another communication device 20, information indicating the TDD configuration that is set through PSBCH. The control unit 204 may extract only a parameter related to uplink from a TDD configuration that is set, and the transmitting unit 201 may transmit, to another communication device 20, only information indicating the parameter related to the uplink through PSBCH. Furthermore, the control unit 204 may extract, in addition to a parameter related to uplink, a parameter related to Flex part from a TDD configuration that is set, and the transmitting unit 201 may transmit, in addition to information indicating the parameter related to the uplink, information indicating the parameter related to Flex part through PSBCH. Furthermore, the control unit 204 may preconfigure one or more pattern candidates (one or more pattern candidates corresponding to a number of uplink slots) indicating a portion assigned to uplink in a TDD configuration. In addition, the control unit 204 may select, from the preconfigured pattern candidates, a pattern corresponding to a portion assigned to uplink (a number of uplink slots) in a TDD configuration that is set for NR-Uu, and the transmitting unit 201 may transmit the selected pattern to another communication device 20 through PSBCH.

When a TDD configuration is dynamically configured, the receiving unit 202 receives a higher layer signal, such as RRC signaling, from the base station 10. The control unit 204 configures, based on the received higher layer signal, a plurality of candidate patterns of a slot format. Furthermore, the receiving unit receives SFI from the base station 10. The control unit 204 selects, based on the SFI, a pattern from the plurality of candidate patterns of the slot format to dynamically configure the TDD configuration with respect to the communication device 20. Furthermore, the control unit 204 may group the configured plurality of candidate patterns of the slot format, for example, based on a number of uplink symbols. In addition, the control unit 204 may select an index of a group corresponding to the slot format to be applied to NR-Uu, and the transmitting unit 201 may transmit the index of the group to another communication device 20.

<Hardware Configuration>

The block diagrams (FIG. 16 and FIG. 17) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 18:
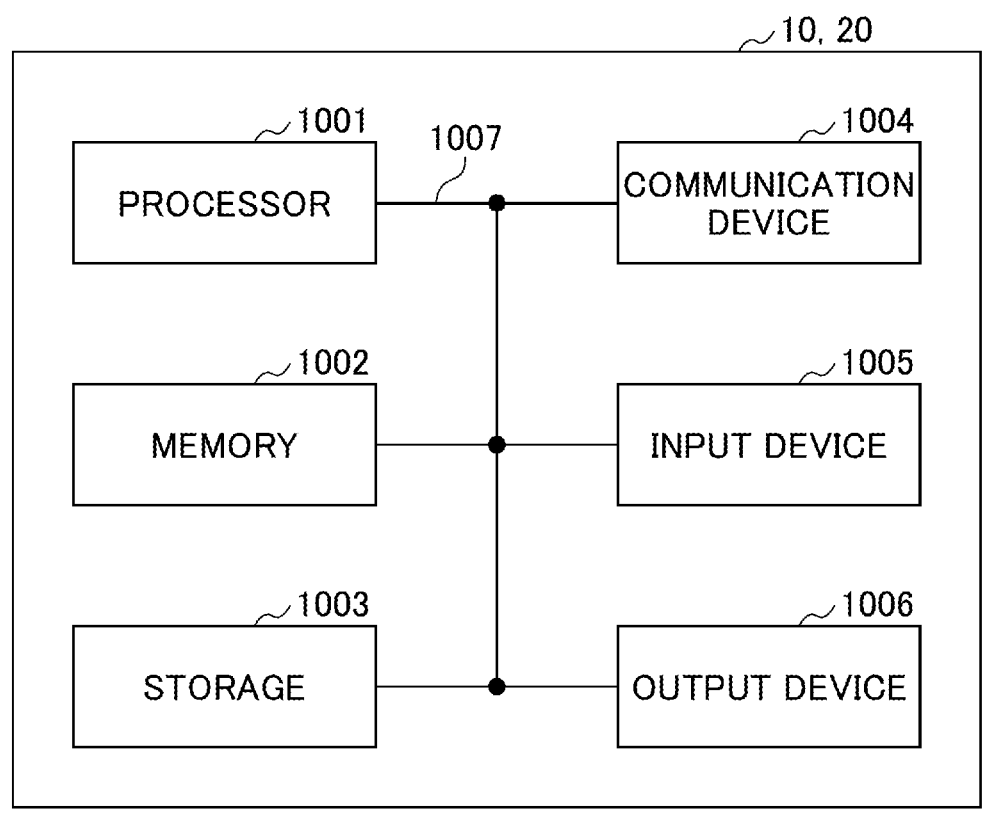
FIG. 18 is a diagram illustrating an example of a hardware configuration of the base station and the communication device according to an embodiment.

For example, the communication device 20 and the base station 10 in an embodiment of the present invention may function as a computer for performing a process of the embodiments. FIG. 18 is a diagram illustrating an example of a hardware configuration of the communication device 20 and the base station 10 according to an embodiment. Each of the communication device 20 and the base station apparatus 10 described above may be physically configured as a computer device including a processor 1001, a memory 1002, a storage 1003, a communication device 1004, an input device 1005, an output device 1006, a bus 1007, and the like.

In the following description, the term "device" can be replaced with a circuit, device, unit, or the like. The hardware configuration of each of the communication device 20 and the base station 10 may be configured to include one or more of devices represented by 1001 through 1006, which are depicted, or may be configured without including some devices.

Each function in each of the communication device 20 and the base station 10 is implemented such that predetermined software (program) is read on hardware such as the processor 1001, the memory 1002 and the like, and the processor 1001 performs an operation and controls communication by the communication device 1004 and at least one of reading and writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like. For example, the above-described baseband signal processing unit 104, the call control unit 105, and the like may be implemented by the processor 1001.

Furthermore, the processor 1001 reads a program (program code), a software module, data, or the like from at least one of the storage 1003 and the communication device 1004 out to the memory 1002, and executes various types of processes according to them. A program causing a computer to execute at least some of the operations described in the above embodiments is used as the program. For example, the control unit 204 of the communication device 20 may be implemented by a control program which is stored in the memory 1002 and operates on the processor 1001, and another functional block may be implemented similarly. Various types of processes are described to be executed by one processor 1001 but may be executed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 may also be referred to as a "register," a "cache," a "main memory," or the like. The memory 1002 can store programs (program codes), software modules, or the like which are executable for carrying out the radio communication method according to an embodiment of the present disclosure.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 may be referred to as an auxiliary storage device. The above-described storage medium may be, for example, a database, a server, or any other appropriate medium including at least one of the memory 1002 and the storage 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD). For example, the above-described transmitting and receiving antennas 101, an amplifier 102, a transceiver 103, a transmission line interface 106, and the like may be implemented by the communication device 1004. The transceiver 103 may be implemented such that a transmitter 103*a* and a receiver 103*b* are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the memory 1002 are connected by the bus 1007 to communicate information with each other. The bus 1007 may be configured with a single bus or may be configured with different buses between the devices.

Furthermore, each of the communication device 20 and the base station 10 may be configured to include hardware such as a microprocessor, a digital signal processor (DSP: Digital Signal Processor), an application specific integrated circuit (ASIC), a programmable logic device (PLD), or a field programmable gate array (FPGA), or all or some of the functional blocks may be implemented by the hardware. For example, the processor 1001 may be implemented by at least one of these hardware components.

Conclusion of the Embodiments

Herein, at least a communication device and a communication method described below are disclosed.

A communication device including a receiving unit that receives information indicating a time division duplex (TDD) configuration; a control unit that obtains information related to an uplink, in the received information indicating the TDD configuration; and a transmitting unit that transmits the information related to the uplink on a sidelink.

For configuring a TDD configuration in the NR-Uu, in particular, in order to prevent the sidelink communication from interfering with the downlink communication, the part that is assigned to the downlink is not used in the sidelink communication, in many cases. That is, in general, the part that can be used in the sidelink communication is the part that is assigned to the uplink, in the TDD configuration. According to the configuration described above, in the TDD configuration, the information indicating the configuration of the part that is not capable of being used in the sidelink communication, that is, the information indicating the configuration of the part that is assigned to the downlink is not transmitted, and thus, it is possible to reduce the information amount at the time of notifying the TDD configuration that is applied to the sidelink communication through the sidelink.

The control unit may select an uplink slot pattern corresponding to the information related to the uplink, from among a plurality of preconfigured uplink slot patterns, and the transmitting unit may transmit information indicating the selected uplink slot pattern on the sidelink. According to such a configuration, for example, the index is transmitted as the information indicating the slot pattern, and thus, it is possible to further reduce the information amount for transmitting, through the sidelink, a notification of the TDD configuration that is applied to the sidelink communication through.

The receiving unit may receive information indicating a specific slot format, the control unit may obtain information indicating a plurality of slot formats, as the information indicating the TDD configuration, may perform grouping of the plurality of slot formats, based on the number of uplink symbols included in each slot format of the plurality of slot formats, and may obtain an index indicating a group corresponding to the information indicating the specific slot format, and the transmitting unit may transmit the index on the sidelink. According to such a configuration, when the method of dynamically configuring a TDD configuration is applied to the NR-Uu, the index of the group obtained by grouping slot formats having a common uplink symbol configuration is provided by notification for transmitting a notification of the slot format on the sidelink, instead of the index of the slot format, and thus, it is possible to reduce the information amount for transmitting a notification of the TDD configuration that is applied to the sidelink communication through the sidelink.

The control unit may obtain information indicating a plurality of slot formats, as the information indicating the TDD configuration, may perform grouping of the plurality of slot formats, based on the number of uplink symbols included in each slot format of the plurality of slot formats, and may obtain a plurality of indices for separately identifying groups that are grouped, and the transmitting unit may transmit the plurality of indices on the sidelink. In addition, the control unit may configure an uplink part that is common in the plurality of slot formats, as a radio resource that is used in sidelink communication. According to such a configuration, in the transmitting communication device and a transmitting device on the reception side, only a common uplink part in the plurality of slot formats can be configured as the radio resource that is used in the sidelink communication, and thus, even if the slot format that is applied to the NR-Uu is dynamically changed, a possibility that the sidelink communication adversely affects the NR-Uu can be decreased.

A communication method executed by a communication device, the method including a step of receiving information indicating a time division duplex (TDD) configuration; a step of obtaining information related to an uplink, in the received information indicating the TDD configuration; and a step of transmitting the information related to the uplink on a sidelink.

When the control unit selects a first configuration, the transmitting unit may transmit, on the sidelink based on a first communication scheme, transmission acknowledgement information with respect to data that is received by the receiving unit on the sidelink based on a second communication scheme, and when the control unit selects a second configuration, the transmitting unit may transmit, on the sidelink based on the second communication scheme, transmission acknowledgement information with respect to data that is received by the receiving unit on the sidelink based on the first communication scheme.

According to the configuration described above, it is possible to reduce the information amount for transmitting, through a sidelink, a notification of the TDD configuration that is applied to the sidelink communication.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the communication device 20 and the base station 10 are described using the functional block diagrams, but such devices may be implemented by hardware, software, or a combination thereof. Software executed by the processor included in the communication device 20 according to the embodiments of the present invention and software executed by the processor included in the base station 10 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in the present disclosure may be reversed in order provided that there is no contradiction. For example, the method described in the present disclosure presents elements of various steps with an exemplary order and is not limited to a presented specific order.

In the present disclosure, a specific operation to be performed by the base station 10 may be performed by an upper node in some cases. In the network including one or more network nodes including the base station 10, various operations performed for communication with the user equipment 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (Boolean: true or false), or may be performed by a comparison of numerical values (for example, a comparison with a predetermined value).

Each aspect/embodiment described in the present disclosure may be used alone, in combination, or may be switched in accordance with the execution. Further, notification of predetermined information (for example, notification of "being X") is not limited to being performed explicitly, but may be performed implicitly (for example, not notifying the predetermined information).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message.

The terms "system" and "network" used in the present disclosure are used interchangeably. Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS: Base Station)," "radio base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of terminals (for example, which may be referred to as device-to-device (D2D) or vehicle-to-everything (V2X)). In this case, the user terminal 20 may have the functions of the base station 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station 10 may have the functions of the above-mentioned user terminal 20.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

In a case in which "include," "including," and variations thereof are used in the present disclosure, these terms are intended to be comprehensive, similar to a term "provided with (comprising)." Further, the term "or" used in the present disclosure is intended not to be an exclusive OR.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted in similarly to "different."

Although the present invention is described above in detail, it is obvious to those skilled in the art that the present invention is not limited to the embodiments described in the specification. The present invention may be implemented as revised and modified embodiments without departing from the gist and scope of the present invention as set forth in claims.

Accordingly, the description of the specification is for the purpose of illustration and does not have any restrictive meaning to the present invention.

LIST OF REFERENCE SYMBOLS

101 transmitting unit
102 receiving unit
103 configuration information managing unit
104 control unit
201 transmitting unit
202 receiving unit
203 configuration information managing unit
204 control unit
1001 processor
1002 memory
1003 storage
1004 communication device
1005 input device
1006 output device

The invention claimed is:

1. A terminal comprising:
    a receiving unit that receives, from a base station, configuration information indicating a time division duplex (TDD) configuration;
    a control unit that obtains first information indicating a value related to a period in an inter-terminal communication based on a pattern of the TDD configuration included in the configuration information, and obtains second information indicating a value related to a number of slots usable for the inter-terminal communication based on the pattern and a subcarrier spacing; and
    a transmitting unit that transmits the first information and the second information to another terminal.

2. The terminal according to claim 1, wherein the transmitting unit transmits the first information and the second information by using a broadcast channel for the inter-terminal communication.

3. A communication system comprising:
    a base station including:
        a transmitting unit that transmits, to a terminal, configuration information indicating a time division duplex (TDD) configuration; and
    the terminal including:
        a receiving unit that receives the configuration information from the base station;
        a control unit that obtains first information indicating a value related to a period in an inter-terminal communication based on a pattern of the TDD configuration included in the configuration information, and obtains second information indicating a value related to a number of slots usable for the inter-terminal communication based on the pattern and a subcarrier spacing; and
        a transmitting unit that transmits the first information and the second information to another terminal.

4. A communication method executed by a terminal, the method comprising:
    receiving, from a base station, configuration information indicating a time division duplex (TDD) configuration;
    obtaining first information indicating a value related to a period in an inter-terminal communication based on a pattern of the TDD configuration included in the configuration information, and obtaining second information indicating a value related to a number of slots usable for the inter-terminal communication based on the pattern and a subcarrier spacing; and
    transmitting the first information and the second information to another terminal.

* * * * *